(12) United States Patent
Kim et al.

(10) Patent No.: US 10,336,621 B2
(45) Date of Patent: Jul. 2, 2019

(54) METHOD OF PREPARING HYDROPHOBIC SILICA AEROGEL AND HYDROPHOBIC SILICA AEROGEL PREPARED THEREBY

(71) Applicant: LG CHEM, LTD., Seoul (KR)

(72) Inventors: Young Hun Kim, Daejeon (KR); Sung Min Yu, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 89 days.

(21) Appl. No.: 15/537,205

(22) PCT Filed: Nov. 4, 2016

(86) PCT No.: PCT/KR2016/012670
§ 371 (c)(1),
(2) Date: Jun. 16, 2017

(87) PCT Pub. No.: WO2017/090911
PCT Pub. Date: Jun. 1, 2017

(65) Prior Publication Data
US 2018/0002181 A1    Jan. 4, 2018

(30) Foreign Application Priority Data

Nov. 27, 2015 (KR) .......................... 10-2015-0167860

(51) Int. Cl.
*C08K 3/36* (2006.01)
*C01B 33/154* (2006.01)
*C01B 33/158* (2006.01)

(52) U.S. Cl.
CPC .......... *C01B 33/154* (2013.01); *C01B 33/158* (2013.01); *C08K 3/36* (2013.01)

(58) Field of Classification Search
CPC ........ C01B 33/154; C01B 33/158; C08K 3/36
See application file for complete search history.

(56) References Cited

U.S. PATENT DOCUMENTS

| 5,705,535 A | 1/1998 | Jansen et al. |
| 5,811,031 A | 9/1998 | Jansen et al. |

(Continued)

FOREIGN PATENT DOCUMENTS

| CN | 1241952 A | 1/2000 |
| EP | 2927194 A1 | 10/2015 |

(Continued)

OTHER PUBLICATIONS

English language translation of KR100566390B16—originally published Mar. 31, 2006. (Year: 2006).*

(Continued)

*Primary Examiner* — Anthony J Zimmer
(74) *Attorney, Agent, or Firm* — Dentons US LLP

(57) ABSTRACT

The present invention relates to a method of preparing a high hydrophobic silica aerogel having a high specific surface area and a low tap density, and a hydrophobic silica aerogel prepared thereby. The method of preparing a hydrophobic silica aerogel according to the present invention may have good productivity and economic efficiency, because preparation time is reduced by simultaneously performing surface modification, gelation, and solvent substitution in a single step, and may control a degree of hydrophobicity of the prepared silica aerogel by controlling a surface modification reaction by including a step of adding ammonium hydroxide. Thus, the preparation method according to the present invention and the hydrophobic silica aerogel are suitable for industries that need the method and the hydrophobic silica aerogel, particularly, industries that need a silica aerogel having high hydrophobicity or industries that need a silica aerogel having various degrees of hydrophobicity.

16 Claims, 1 Drawing Sheet

(56) References Cited

U.S. PATENT DOCUMENTS

| | | |
|---|---|---|
| 2001/0034375 A1 | 10/2001 | Schwertfeger et al. |
| 2016/0264427 A1 | 9/2016 | Oh et al. |
| 2016/0280557 A1 | 9/2016 | Kim et al. |

FOREIGN PATENT DOCUMENTS

| | | |
|---|---|---|
| KR | 10-0566390 B1 | 3/2006 |
| KR | 10-2008-0084241 A | 9/2008 |
| KR | 10-2009-0115703 A | 11/2009 |
| KR | 10-2012-0126741 A | 11/2012 |
| KR | 10-2015-0093062 A | 8/2015 |
| KR | 2015-0093063 A | 8/2015 |
| WO | 2015/119430 A1 | 8/2015 |

OTHER PUBLICATIONS

Bhagat et al., "A cost-effective and fast synthesis of nanoporous $SiO_2$ aerogel powders using water-glass via ambient pressure drying route," Solid State Sciences, Elsevier, vol. 9, No. 7, pp. 628-635 (2007).

Bhagat et al., "Superhydrophobic silica aerogel powders with simultaneous surface modification, solvent exchange and sodium ion removal from hydrogels," Microporous and Mesoporous Materials, Elsevier, vol. 112, No. 1-3, pp. 504-509 (2008).

Lee et al., "Synthesis of silica aerogels from waterglass via new modified ambient drying," Journal of Materials Science, Kluwer Academic Publishers, vol. 37, No. 11, pp. 2237-2241 (2002).

Rao et al., "Effect of protic solvents on the physical properties of the ambient pressure dried hydrophobic silica aerogels using sodium silicate precursor," Journal of Porous Materials, Kluwer Academic Publishers, vol. 15, No. 5, pp. 507-512 (2007).

\* cited by examiner

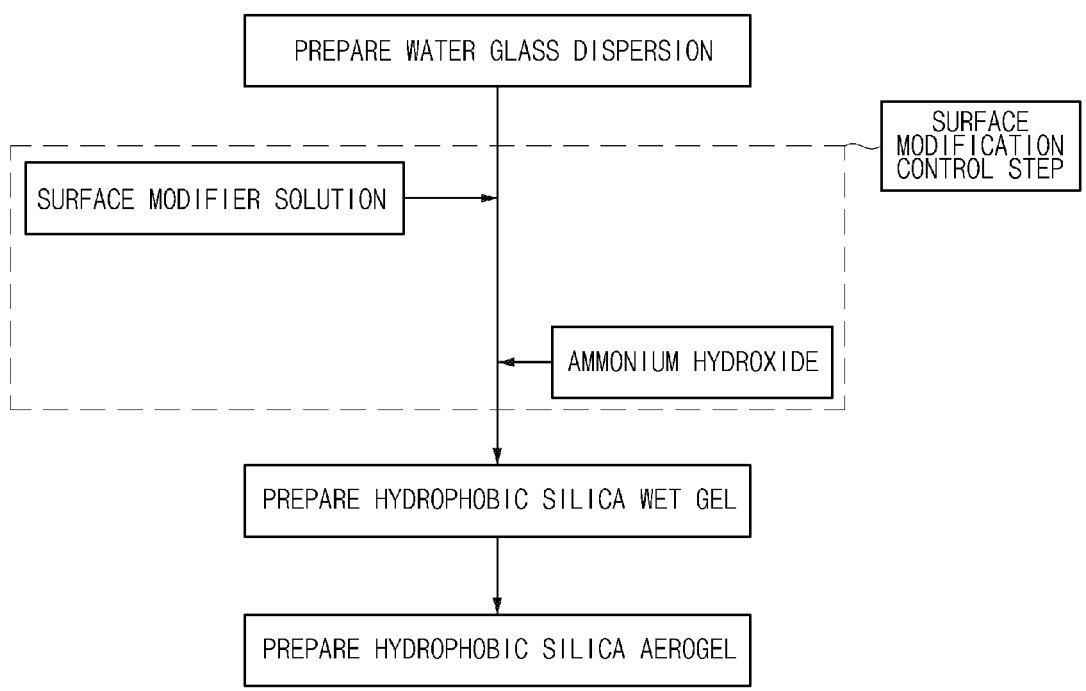

METHOD OF PREPARING HYDROPHOBIC SILICA AEROGEL AND HYDROPHOBIC SILICA AEROGEL PREPARED THEREBY

CROSS-REFERENCE TO RELATED APPLICATIONS

This application is a National Stage Application of International Application No. PCT/KR2016/012670 filed on Nov. 4, 2016, which claims the benefit of Korean Patent Application No. 10-2015-0167860 filed on Nov. 27, 2015, all of which are hereby incorporated by reference in their entirety for all purposes as if fully set forth herein.

TECHNICAL FIELD

The present invention relates to a method of preparing a high hydrophobic silica aerogel having a high specific surface area and a low tap density, and a hydrophobic silica aerogel prepared thereby.

BACKGROUND ART

Since an aerogel, as a high specific area ($\geq 500$ m$^2$/g), ultra-porous material having a porosity of about 90% to about 99.9% and a pore diameter of about 1 nm to about 100 nm, has excellent characteristics such as ultra lightweightness, ultra insulation, and ultra-low dielectric constant, research into the applications of the aerogel as a transparent insulator and an environmentally-friendly high-temperature insulator, an ultra-low dielectric thin film for a highly integrated device, a catalyst and a catalyst support, an electrode for a supercapacitor, and an electrode material for desalination as well as the development of an aerogel material has been actively conducted.

The biggest advantage of the aerogel is super-insulation having a thermal conductivity of 0.300 W/m·K or less which is lower than that of an organic insulation material such as a typical Styrofoam. Also, the aerogel may address fire vulnerability and generation of toxic gas in case of fire, i.e., fatal weaknesses of a typical organic insulation material.

In general, a wet gel is prepared from a silica precursor such as water glass or tetraethoxysilane (TEOS), and an aerogel is then prepared by removing a liquid component in the wet gel without destroying its microstructure. A silica aerogel may be categorized into three typical forms, powder, granules, and monolith, and the silica aerogel is generally prepared in the form of powder.

The silica aerogel powder may be commercialized in a form, such as an aerogel blanket or aerogel sheet, by compositing with fibers, and, since the blanket or sheet has flexibility, it may be bent, folded, or cut to a predetermined size or shape. Thus, the silica aerogel may be used in household goods, such as jackets or shoes, as well as industrial applications such as an insulation panel of a liquefied natural gas (LNG) carrier, an industrial insulation material and a space suit, transportation and vehicles, and an insulation material for power generation. Furthermore, in a case where a silica aerogel is used in a fire door as well as a roof or floor in a home such as an apartment, it has a significant effect in preventing fire.

However, since the silica aerogel powder may be scattered due to high porosity, very low tap density, and small particle size, handling may be difficult and fill may not be easy.

Also, although the silica aerogel monolith has high transparency in visible light region, the silica aerogel monolith may have a size limitation, may be difficult to be molded in various shapes, and may be easily broken.

In order to address the above-described limitations of the silica aerogel powder and monolith, attempts have been made to increase ease of handling and shape-responsiveness by preparing silica aerogel granules having a diameter of 0.5 mm or more. For example, there are methods such as the method in which a reaction solution obtained by hydrolyzing alkoxysilane is prepared as a filler, gelation is performed by polycondensation of the filler with a catalyst, a hydrophobic treatment is performed by reacting with a hydrophobic agent, and supercritical drying is then performed to obtain hydrophobic silica aerogel granules; and the method in which aerogel particles including additives and binder are supplied to a molding machine and compressed to prepare silica aerogel granules.

However, since the above-described methods use an ancillary granulating device and an additive such as a binder, technically complex process and long process time may not only be required, but complex processing procedures and high investment costs may also be required when a silica aerogel is mass-produced by the above-described methods. As a result, a lot of time and expensive chemicals are required, and accordingly, production costs may not only be increased, but also a particle size of the finally obtainable silica aerogel may not be uniform or may be excessively large.

Furthermore, since gel structure characteristics and physical properties are reduced when the silica aerogel absorbs moisture, there is a need to develop a method, which may permanently prevent the absorption of moisture in the air, for ease of use in industry. Thus, methods of preparing a silica aerogel having permanent hydrophobicity by performing a hydrophobic treatment on a surface of the silica aerogel have been proposed. In general, a silica aerogel having hydrophobicity is being prepared by using a surface modifier. However, in a case in which the surface of the silica aerogel is hydrophobized only with the surface modifier, since a large amount of the expensive surface modifier may be used and it may be difficult to control a surface modification reaction, productivity and economic efficiency are low and there are limitations in preparing a silica aerogel having high hydrophobicity.

Therefore, there is a need to develop a method which may prepare a silica aerogel having high hydrophobicity by controlling hydrophobicity while easily controlling a surface modification reaction.

DISCLOSURE OF THE INVENTION

Technical Problem

An aspect of the present invention provides a method of preparing a hydrophobic silica aerogel which may prepare a silica aerogel having high hydrophobicity by using a simple preparation process and easily controlling a surface modification reaction.

Another aspect of the present invention provides a hydrophobic silica aerogel prepared by the above preparation method.

Technical Solution

According to an aspect of the present invention, there is provided a method of preparing a hydrophobic silica aerogel including the steps of: preparing a water glass dispersion (step 1); adding the water glass dispersion and a surface modifier solution to a reactor and performing a reaction to prepare a hydrophobic silica wet gel (step 2); and drying the hydrophobic silica wet gel (step 3), wherein the method further includes adding ammonium hydroxide during the reaction of step 2.

According to another aspect of the present invention, there is provided a hydrophobic silica aerogel prepared by the above method.

Advantageous Effects

A method of preparing a hydrophobic silica aerogel according to the present invention may have good productivity and economic efficiency, because preparation time is reduced by simultaneously performing surface modification, gelation, and solvent substitution in a single step, and may control a degree of hydrophobicity of the prepared silica aerogel by controlling a surface modification reaction by including a step of adding ammonium hydroxide.

Also, since a hydrophobic silica aerogel according to the present invention is prepared by the above preparation method, physical properties, such as tap density and specific surface area, may not only be excellent, but high hydrophobicity may also be obtained by controlling the degree of hydrophobicity.

Thus, the preparation method according to the present invention and the hydrophobic silica aerogel are suitable for industries that need the method and the hydrophobic silica aerogel, particularly, industries that need a silica aerogel having high hydrophobicity or industries that need a silica aerogel having various degrees of hydrophobicity.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 schematically illustrates a flowchart of a method of preparing a hydrophobic silica aerogel according to an embodiment of the present invention.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The present invention provides a method of preparing a hydrophobic silica aerogel having improved surface hydrophobicity.

In general, a hollow of a silica wet gel prepared using water glass is filled with water, i.e., a solvent, and, when the solvent is simply removed by drying, shrinkage and cracking of a pore structure may easily occur due to high surface tension of water at a gas/liquid interface while the liquid phase solvent is evaporated into a gas phase. As a result, a decrease in surface area and changes in pore structure may occur. Thus, in order to maintain the pore structure of the wet gel, there is not only a need to substitute water having high surface tension with an organic solvent having relatively low surface tension, but also to develop a technique capable of washing and drying the wet gel without shrinkage while maintaining the structure of the wet gel as it is.

Also, the dried silica aerogel maintains low thermal conductivity immediately after the drying, but the thermal conductivity may gradually increase because a hydrophilic silanol group (Si—OH) present on the surface of silica absorbs water in the air. Thus, there is a need to modify the surface of the silica aerogel into hydrophobic to maintain low thermal conductivity. Accordingly, a method of modifying the surface of the silica aerogel by using a surface modifier has been widely used. However, since a large amount of the surface modifier is required to prepare a silica aerogel having high hydrophobicity by only using the surface modifier and it is difficult to control a surface modification reaction, productivity may be low.

Thus, the present invention provides a method of preparing a highly hydrophobic silica aerogel having excellent physical properties while maintaining a pore structure and low thermal conductivity of the silica aerogel.

Hereinafter, a method of preparing a hydrophobic silica aerogel according to an embodiment of the present invention will be described in detail with reference to FIG. 1.

FIG. 1 schematically illustrates a flowchart of the method of preparing a hydrophobic silica aerogel according to the embodiment of the present invention.

The preparation method according to the embodiment of the present invention includes the steps of: preparing a water glass dispersion (step 1); adding the water glass dispersion and a surface modifier solution to a reactor and performing a reaction to prepare a hydrophobic silica wet gel (step 2); and drying the hydrophobic silica wet gel (step 3), wherein the method further includes a step of adding ammonium hydroxide during the reaction of step 2.

Step 1 is a step for preparing a water glass dispersion, and the water glass dispersion may include a water glass solution and an inorganic acid.

Specifically, the water glass dispersion may be a mixture of the water glass solution and the inorganic acid, which is prepared by adding the water glass solution to the inorganic acid and mixing together. In this case, the water glass dispersion may include the inorganic acid in a molar ratio of 1 to 3 based on water glass in the water glass solution.

The water glass solution may be a dilute solution in which distilled water is added to water glass and mixed, and the water glass may be sodium silicate ($Na_2SiO_3$) as an alkali silicate salt obtained by melting silicon dioxide ($SiO_2$) and alkali.

The water glass dispersion may contain 1 wt % to 11 wt % of silicon dioxide ($SiO_2$). In a case in which the silicon dioxide in the water glass dispersion is included in an amount less than the above range, an aerogel may not be formed properly, and, in a case in which the silicon dioxide in the water glass dispersion is included in an amount greater than the above range, a specific surface area may be reduced.

While the inorganic acid is mixed with the silicon dioxide in the water glass solution in the water glass dispersion, the inorganic acid may play a role in activating decomposition of a surface modifier by reacting with the surface modifier in the surface modifier solution to be described later, and thus, the inorganic acid may improve the surface modification reaction and may promote generation of ammonia to increase a pH value. Therefore, the inorganic acid may induce gelation. The inorganic acid is not particularly limited, but may, for example, be at least one selected from the group consisting of nitric acid, hydrochloric acid, sulfuric acid, and hydrofluoric acid. Specifically, the inorganic acid may be nitric acid.

Also, the water glass dispersion may have a pH of 5 to 11.

Step 2 is a step for preparing a hydrophobic silica wet gel, and may be performed by adding a surface modifier solution to the water glass dispersion and performing a reaction.

Specifically, the water glass dispersion and the surface modifier solution were added to a reactor and performing a reaction to prepare a hydrophobic silica wet gel.

The surface modifier solution may be prepared by adding the surface modifier to a non-polar organic solvent and mixing together, and in this case, a concentration of the surface modifier in the surface modifier solution may be in a range of 0.1 M to 4 M. That is, the surface modifier solution may be prepared by adding the surface modifier to the non-polar organic solvent in an amount of 0.1 M to 4 M and then mixing together.

Also, the surface modifier solution may be added in an amount such that a molar ratio of the surface modifier to the water glass in the water glass dispersion is in a range of 0.1 to 10. In a case in which the surface modifier solution is added in an amount such that the molar ratio of the surface modifier to the water glass is less than 0.1, since the amount of the surface modifier able to react with a silanol group (Si—OH) is relatively smaller than the amount of the silanol group (Si—OH) in the water glass dispersion, surface modification reactivity may not only be reduced but also surface modification may not be easily performed. Accordingly, the silanol group, which is not surface-modified, causes a condensation reaction during drying so that the size of pores of the resultant silica aerogel may be decreased and porosity may not be obtained. Furthermore, in a case in which the surface modifier solution is added in an amount such that the molar ratio of the surface modifier to the water glass is greater than 10, a large amount of the remaining surface modifier, which does not participate in the surface modification reaction, may be present and economic efficiency may be reduced because the expensive surface modifier is wasted.

The surface modifier may be at least one selected from the group consisting of trimethylchlorosilane (TMCS), hexamethyldisilazane (HMDS), methyltrimethoxysilane, and trimethylethoxysilane.

The non-polar organic solvent may be at least one selected from the group consisting of hexane, heptane, toluene, and xylene.

The reaction may be performed by adding the water glass dispersion and the surface modifier solution to the reactor and mixing by stirring. In this case, the surface modifier solution is not particularly limited, but the water glass dispersion and the surface modifier solution may be added to the reactor at the same time, or the surface modifier solution may be sequentially added after the water glass dispersion is added to the reactor.

Specifically, after the water glass dispersion is added to the reactor, the surface modifier solution may be added when a temperature in the reactor reaches 25° C. to 95° C. That is, after the water glass dispersion is added to the reactor, the temperature in the reactor is increased within the above range and the surface modifier solution may then be added to proceed the reaction. In this case, the reactor may be a reactor with a stirrer, and the reaction may be performed while stirring. The stirring is not particularly limited, but, for example, may be performed at a rate of 50 rpm to 700 rpm.

In the preparation method according to the embodiment of the present invention, gelation and solvent substitution may be simultaneously performed while the surface modification reaction is performed by reacting the water glass dispersion with the surface modifier solution.

Specifically, in the preparation method, since the water glass dispersion including the inorganic acid is mixed and reacted with the surface modifier solution, the decomposition of the surface modifier in the surface modifier solution may be activated by the inorganic acid, and thus, the surface modification reaction may be promoted. In addition, since the decomposition of the surface modifier is activated, the generation of ammonia due to the decomposition of the surface modifier may be increased. Accordingly, since a pH in the reactor is increased by the ammonia, a basic environment may be created. Thus, the gelation may be induced. Also, the solvent substitution may be performed while the surface modification reaction and the gelation may be performed with the non-polar organic solvent included in the surface modifier solution.

In order to further promote the surface modification reaction and the gelation, the preparation method may further include a step of adding ammonium hydroxide during the reaction.

Specifically, the ammonium hydroxide may be added after the entire amount of the surface modifier solution used in the reaction has been added to the reactor, and, for example, after the entire amount of the surface modifier solution has been added to the reactor, the ammonium hydroxide may be allowed to participate in the reaction by being added when the pH in the reactor reaches 5 to 10, or the ammonium hydroxide may be allowed to participate in the reaction by being added after the solvent substitution is completed.

In this case, the time when the pH reaches the above range may be changed depending on a water glass concentration in the water glass dispersion, and, for example, in a case in which the water glass concentration in the water glass dispersion is 4 wt %, the time may be 30 minutes±3 minutes immediately after the addition of the entire amount of the surface modifier solution to the reactor. Also, the time when the solvent substitution is completed may denote a time when water filling pores in the wet gel is substituted with the organic solvent used, and may be confirmed by the presence of dispersion when the wet gel generated during the reaction is extracted and put in a water phase or organic solvent phase.

Also, an amount of the ammonium hydroxide added is not particularly limited as long as it is an amount by which the surface modification reaction and the gelation may be easily carried out without causing problems due to other addition reactions, but, for example, the ammonium hydroxide may be added in an amount such that a pH in the reactor after the addition of the ammonium hydroxide is increased by 5% to 57% in comparison to a pH in the reactor before the addition of the ammonium hydroxide. For example, in a case in which the pH in the reactor before the addition of the ammonium hydroxide is 7, the ammonium hydroxide may be added in an amount such that the pH in the reactor is in a range of 7.35 to 11.

Specifically, the ammonium hydroxide may be added in an amount such that a molar ratio of the ammonium hydroxide to the surface modifier in the surface modifier solution is in a range of 0.5 to 25 within the amount that adjusts the pH within the above range.

Since the ammonium hydroxide is allowed to participate in the reaction by being further added during the reaction of step 2, the preparation method according to the embodiment of the present invention may improve the surface modification reaction, and thus, a silica aerogel having high hydrophobicity may be prepared without using a large amount of the expensive surface modifier.

Step 3 is a step of drying the hydrophobic silica wet gel in order to prepare a hydrophobic silica aerogel.

In this case, a step of washing may be further performed before the drying.

The washing is to obtain a high purity hydrophobic silica aerogel by removing impurities (sodium ions, unreacted products, by-products, etc.) generated during the reaction, wherein the washing may be performed by adding the non-polar organic solvent to the hydrophobic silica wet gel and stirring for 20 minutes to 1 hour, but the present invention is not limited thereto.

The drying may be performed by atmospheric pressure drying at a temperature of 100° C. to 190° C. for 1 hour to 4 hours, but the present invention is not limited thereto.

Also, the present invention provides a hydrophobic silica aerogel prepared by the above preparation method.

The hydrophobic silica aerogel according to an embodiment of the present invention may have a specific surface area of 600 $m^2/g$ to 1,000 $m^2/g$.

Furthermore, the hydrophobic silica aerogel may have a tap density of 0.04 g/ml to 0.15 g/ml and may have a carbon content of 12 wt % to 16 wt %.

Since the hydrophobic silica aerogel according to the embodiment of the present invention is prepared by the above preparation method, the hydrophobic silica aerogel according to the embodiment of the present invention may have high hydrophobicity as well as excellent physical properties such as excellent pore characteristics.

Hereinafter, the present invention will be described in more detail, according to the following examples and experimental examples. However, the following examples and experimental examples are merely presented to exemplify the present invention, and the scope of the present invention is not limited thereto.

EXAMPLE 1

A water glass solution was slowly added to 6.2 g of nitric acid to prepare a water glass dispersion. In this case, the water glass solution was used in an amount such that 11.7 g of water glass was added, and an amount of silicon dioxide ($SiO_2$) in the prepared water glass dispersion was 3.4 wt %. A temperature in a reactor was set at 55° C. while the prepared water glass dispersion was put in the reactor and stirred. Thereafter, a hexamethyldisilazane solution was added to the reactor to perform a reaction. In this case, the hexamethyldisilazane solution was prepared by adding 6.3 g of hexamethyldisilazane to 100 ml of n-hexane and stirring the mixture. When a pH in the reactor reached 7 after the reaction began, 2.7 g of ammonium hydroxide was added to participate in the reaction (use 2.0 moles of the ammonium hydroxide based on the hexamethyldisilazane). When a prepared hydrophobic silica wet gel completely floated on a surface, 20 ml of n-hexane was added, a lower aqueous solution layer was discharged, and, after 2 hours, the hydrophobic silica wet gel was completely dried in a forced circulation dryer at 150° C. for 1 hour to prepare a hydrophobic silica aerogel.

EXAMPLE 2

A hydrophobic silica aerogel was prepared in the same manner as in Example 1 except that 8.9 g of ammonium hydroxide was used. In this case, the ammonium hydroxide was used in an amount of 6.5 moles based on hexamethyldisilazane.

EXAMPLE 3

A hydrophobic silica aerogel was prepared in the same manner as in Example 1 except that 13.4 g of ammonium hydroxide was used. In this case, the ammonium hydroxide was used in an amount of 9.8 moles based on hexamethyldisilazane.

EXAMPLE 4

A hydrophobic silica aerogel was prepared in the same manner as in Example 1 except that 0.7 g of ammonium hydroxide was used. In this case, the ammonium hydroxide was used in an amount of 0.5 moles based on hexamethyldisilazane.

EXAMPLE 5

A hydrophobic silica aerogel was prepared in the same manner as in Example 1 except that 34 g of ammonium hydroxide was used. In this case, the ammonium hydroxide was used in an amount of 25 moles based on hexamethyldisilazane.

EXAMPLE 6

A hydrophobic silica aerogel was prepared in the same manner as in Example 1 except that the water glass solution was used in an amount such that an amount of water glass was 9.4 g, and 5.4 g of nitric acid, 5.5 g of hexamethyldisilazane, and 1.9 g of ammonium hydroxide were used.

EXAMPLE 7

A hydrophobic silica aerogel was prepared in the same manner as in Example 1 except that the water glass solution was used in an amount such that an amount of water glass was 12.5 g, and 7.2 g of nitric acid, 7.3 g of hexamethyldisilazane, and 2.1 g of ammonium hydroxide were used.

EXAMPLE 8

A hydrophobic silica aerogel was prepared in the same manner as in Example 1 except that the water glass solution was used in an amount such that an amount of water glass was 15.6 g, and 9.0 g of nitric acid, 9.1 g of hexamethyldisilazane, and 2.7 g of ammonium hydroxide were used.

EXAMPLE 9

A hydrophobic silica aerogel was prepared in the same manner as in Example 1 except that the water glass solution was used in an amount such that an amount of water glass was 18.8 g, and 10.8 g of nitric acid, 10.8 g of hexamethyldisilazane, and 3.2 g of ammonium hydroxide were used.

EXAMPLE 10

A hydrophobic silica aerogel was prepared in the same manner as in Example 1 except that 2.7 g of ammonium hydroxide was added immediately after solvent substitution was completed, instead of when the pH reached 7.

Comparative Example 1

A hydrophobic silica aerogel was prepared in the same manner as in Example 1 except that the step of adding the ammonium hydroxide was omitted.

Comparative Example 2

A hydrophobic silica aerogel was prepared in the same manner as in Example 1 except that ammonium hydroxide was simultaneously added with a surface modifier solution.

Comparative Example 3

A hydrophobic silica aerogel was prepared in the same manner as in Example 1 except that 0.4 g of ammonium hydroxide was used. In this case, the ammonium hydroxide was used in an amount of 0.3 moles based on hexamethyldisilazane.

Comparative Example 4

A hydrophobic silica aerogel was prepared in the same manner as in Example 1 except that 35 g of ammonium hydroxide was used. In this case, the ammonium hydroxide was used in an amount of 25.6 moles based on hexamethyldisilazane.

Comparative Example 5

A hydrophobic silica aerogel was prepared in the same manner as in Example 6 except that ammonium hydroxide was not used.

Comparative Example 6

A hydrophobic silica aerogel was prepared in the same manner as in Example 7 except that ammonium hydroxide was not used.

Comparative Example 7

A hydrophobic silica aerogel was prepared in the same manner as in Example 8 except that ammonium hydroxide was not used.

Comparative Example 8

A hydrophobic silica aerogel was prepared in the same manner as in Example 9 except that ammonium hydroxide was not used.

Experimental Example

In order to compare physical properties of the hydrophobic silica aerogels prepared in Examples 1 to 10 and Comparative Examples 1 to 8, tap density (g/ml), specific surface area (Brunauer-Emmett-Teller (BET), $m^2/g$), and carbon content (wt %) of each aerogel were measured. The results thereof are presented in Table 1 below.

(1) Tap Density (g/ml)

Tap density was measured using a tap density tester (STAV II, Engelsmann AG).

Specifically, after a weight of each aerogel was measured by putting the each aerogel into a standardized cylinder (25 ml), the cylinder was then fixed to the tap density tester, a noise damping hood was closed, and 2,500 tappings were set. After tapping measurement was completed, a volume of each aerogel in the cylinder was measured, and density was measured by calculating a ratio of the weight previously measured to the volume.

(2) Specific Surface Area (BET, $m^2/g$)

Specific surface areas were analyzed from amounts of nitrogen adsorbed and desorbed according to partial pressure ($0<p/p_o<1$) using a 3FLEX analyzer (Micromeritics).

Specifically, 100 mg of each aerogel was put in a cylinder and was subjected to a pretreatment at 200° C. for 8 hours, and the specific surface area was then measured using a specific surface area analyzer.

(3) Carbon Content (wt %)

Carbon contents were measured using a carbon analyzer (Carbon-Sulfur Analyzer CS-2000, Eltra GmbH).

TABLE 1

| Category | Tap density (g/ml) | Carbon content (wt %) | Specific surface area ($m^2/g$) |
| --- | --- | --- | --- |
| Example 1 | 0.094 | 12.2 | 652 |
| Example 2 | 0.105 | 13.7 | 634 |
| Example 3 | 0.134 | 14.5 | 647 |
| Example 4 | 0.132 | 12.1 | 652 |
| Example 5 | 0.148 | 15.5 | 621 |
| Example 6 | 0.084 | 13.3 | 675 |
| Example 7 | 0.094 | 13.6 | 697 |
| Example 8 | 0.109 | 14.3 | 732 |
| Example 9 | 0.109 | 14.4 | 643 |
| Example 10 | 0.088 | 13.1 | 660 |
| Comparative Example 1 | 0.103 | 11.2 | 604 |
| Comparative Example 2 | 0.101 | 11.5 | 403 |
| Comparative Example 3 | 0.175 | 10.8 | 649 |
| Comparative Example 4 | 0.363 | 16.5 | 526 |
| Comparative Example 5 | 0.115 | 13.1 | 511 |
| Comparative Example 6 | 0.106 | 11.4 | 632 |
| Comparative Example 7 | 0.092 | 12.6 | 653 |
| Comparative Example 8 | 0.112 | 12.8 | 612 |

As illustrated in Table 1, it was confirmed that the hydrophobic silica aerogels of Examples 1 to 10 prepared by the preparation method according to the embodiment of the present invention generally had high carbon contents while having low tap densities and high specific surface areas in comparison to the hydrophobic silica aerogels of Comparative Examples 1 to 8.

Specifically, as a result of comparing the hydrophobic silica aerogels of Example 1 and Comparative Example 1, the hydrophobic silica aerogels of Example 6 and Comparative Example 5, the hydrophobic silica aerogels of Example 7 and Comparative Example 6, the hydrophobic silica aerogels of Example 8 and Comparative Example 7, and the hydrophobic silica aerogels of Example 9 and Comparative Example 8 which were prepared under the same conditions except whether the ammonium hydroxide was added or not, the hydrophobic silica aerogels of Example 1 and Examples 6 to 9, which were prepared by adding the ammonium hydroxide, had high carbon content and specific surface area characteristics while having low tap densities in comparison to the hydrophobic silica aerogels of Comparative Example 1 and Comparative Examples 5 to 8, as respective comparison targets in which ammonium hydroxide was not added.

Also, with respect to the hydrophobic silica aerogel of Comparative Example 2 in which ammonium hydroxide was added, but the ammonium hydroxide was simultaneously added with the surface modifier solution to participate in the reaction instead of being added at the time suggested in the present invention, the tap density was increased, the carbon content was reduced, and the specific surface area characteristics were significantly reduced by about 62% in comparison to the hydrophobic silica aerogel of Example 1.

In addition, the hydrophobic silica aerogel of Comparative Example 3, which was prepared by adding ammonium hydroxide in an amount of less than the amount suggested in the present invention, had similar levels of specific surface area characteristics, but the tap density was significantly increased by about 132% and the carbon content was reduced by about 89% in comparison to the hydrophobic silica aerogel of Example 4. Furthermore, with respect to the hydrophobic silica aerogel of Comparative Example 4 which was prepared by adding ammonium hydroxide in an amount of greater than the amount suggested in the present invention, the carbon content was somewhat increased, but the specific surface area was significantly reduced by about 85% and the tap density was rapidly increased by about 245% in comparison to the hydrophobic silica aerogel of Example 5.

The above results indicated that the surface modification reaction may be improved by adding the ammonium hydroxide in the preparation method according to the embodiment of the present invention, and thus, hydrophobicity of the hydrophobic silica aerogel prepared by the above preparation method may be improved. Furthermore, the above results indicated that control of the addition time and amount of the ammonium hydroxide was an important factor for promoting the desired surface modification reaction and gelation without causing problems due to other addition reactions.

The invention claimed is:

1. A method of preparing a hydrophobic silica aerogel, the method comprising steps of:
    (1) preparing a water glass dispersion;
    (2) adding the water glass dispersion and a surface modifier solution to a reactor and performing a reaction to prepare a hydrophobic silica wet gel; and
    (3) drying the hydrophobic silica wet gel,
    wherein the method further comprises adding ammonium hydroxide during the reaction of step (2).

2. The method of claim 1, wherein the water glass dispersion contains 1 wt % to 11 wt % of silicon dioxide ($SiO_2$).

3. The method of claim 1, wherein the water glass dispersion has a pH of 5 to 11.

4. The method of claim 1, wherein the water glass dispersion comprises a water glass solution and an inorganic acid.

5. The method of claim 4, wherein the water glass dispersion comprises the inorganic acid in a molar ratio of 1 to 3 based on water glass in the water glass solution.

6. The method of claim 4, wherein the inorganic acid comprises at least one selected from the group consisting of nitric acid, hydrochloric acid, sulfuric acid, and hydrofluoric acid.

7. The method of claim 1, wherein the surface modifier solution is prepared by adding a surface modifier to a non-polar organic solvent and mixing together, and
    a concentration of the surface modifier in the surface modifier solution is in a range of 0.1 M to 4 M.

8. The method of claim 7, wherein the surface modifier comprises at least one selected from the group consisting of trimethylchlorosilane (TMCS), hexamethyldisilazane (HMDS), methyltrimethoxysilane, and trimethylethoxysilane.

9. The method of claim 7, wherein the non-polar organic solvent comprises at least one selected from the group consisting of hexane, heptane, toluene, and xylene.

10. The method of claim 1, wherein the surface modifier solution is added in an amount such that a molar ratio of a surface modifier to water glass in the water glass solution is in a range of 0.1 to 10.

11. The method of claim 1, wherein the surface modifier solution is added when the water glass dispersion is added to the reactor and a temperature in the reactor reaches 25° C. to 95° C.

12. The method of claim 1, wherein the ammonium hydroxide is added after an entire amount of the surface modifier solution is added.

13. The method of claim 1, wherein, after an entire amount of the surface modifier solution is added, the ammonium hydroxide is added when a pH in the reactor reaches 5 to 10.

14. The method of claim 1, wherein the ammonium hydroxide is added in an amount such that a pH in the reactor after the addition of the ammonium hydroxide is increased by 5% to 57% in comparison to a pH in the reactor before the addition of the ammonium hydroxide.

15. The method of claim 1, wherein the ammonium hydroxide is added in an amount such that a molar ratio of the ammonium hydroxide to a surface modifier in the surface modifier solution is in a range of 0.5 to 25.

16. The method of claim 1, wherein the drying of step (3) is performed by atmospheric pressure drying at a temperature of 100° C. to 190° C. for 1 hour to 4 hours.

* * * * *